US005811792A

United States Patent [19]

Verschuur et al.

[11] Patent Number: 5,811,792

[45] Date of Patent: Sep. 22, 1998

[54] METHOD AND APPARATUS FOR ACCESSING CONTENTS OF ENVELOPES AND OTHER SIMILARLY CONCEALED INFORMATION

[75] Inventors: Gerrit L. Verschuur; Chauncey T. Mitchell, Jr., both of Lakeland, Tenn.

[73] Assignee: Wisconsin Label Corporation, Algoma, Wis.

[21] Appl. No.: 778,077

[22] Filed: Jan. 2, 1997

[51] Int. Cl.[6] ................................ G01N 9/04; B07C 5/00

[52] U.S. Cl. ................ 250/223 R; 250/557; 250/559.44; 209/584; 209/900

[58] Field of Search ........................ 250/223 R, 555–557, 250/559.4, 559.44; 209/583, 584, 900

[56] References Cited

U.S. PATENT DOCUMENTS

| | | |
|---|---|---|
| 2,588,811 | 3/1952 | Dippel et al. . |
| 3,373,869 | 3/1968 | Burson, Jr. . |
| 3,567,895 | 3/1971 | Paz . |
| 3,854,808 | 12/1974 | Germer . |
| 3,873,181 | 3/1975 | Chivian et al. . |
| 3,888,715 | 6/1975 | Fraser et al. . |
| 3,894,892 | 7/1975 | Conta . |
| 3,969,225 | 7/1976 | Horowitz . |
| 4,035,547 | 7/1977 | Heller, Jr. et al. . |
| 4,123,306 | 10/1978 | Landry . |
| 4,140,130 | 2/1979 | Storm, III . |
| 4,308,542 | 12/1981 | Maekawa et al. . |
| 4,460,676 | 7/1984 | Fabel . |
| 4,461,661 | 7/1984 | Fabel . |
| 4,469,026 | 9/1984 | Irwin . |
| 4,734,643 | 3/1988 | Bubenik et al. . |
| 4,751,356 | 6/1988 | Fukuda et al. . |
| 4,914,266 | 4/1990 | Parks et al. . |
| 4,991,539 | 2/1991 | Sarda . |
| 5,036,984 | 8/1991 | Labarthe . |
| 5,067,404 | 11/1991 | Frunder et al. . |
| 5,175,031 | 12/1992 | Ochocki . |
| 5,209,355 | 5/1993 | Mindermann . |
| 5,213,041 | 5/1993 | Kanck . |
| 5,214,442 | 5/1993 | Roller . |
| 5,217,765 | 6/1993 | Parks . |
| 5,220,346 | 6/1993 | Carreira et al. . |
| 5,223,188 | 6/1993 | Brundage et al. . |
| 5,223,684 | 6/1993 | Li et al. . |
| 5,231,268 | 7/1993 | Hall et al. . |

(List continued on next page.)

OTHER PUBLICATIONS

"Analyses of Electromagnetic Fields Induced in Biological Tissues by Thermographic Studies on Equivalent Phantom Models" by Arthur W. Guy, IEEE Transactions on Microwave Theory and Techniques, Feb. 1971, vol. MTT–19, No. 2, pp. 205–214.

"Infrared Application to the Detection of Induced Surface Currents" by Ronald M. Sega, Victor M. Martin, Donald B. Warmuth, and Robert W. Burton, SPIE vol. 304, Modern Utilization of Infrared Technology VII, 1981, pp. 84–91.

"Infrared Video Cameras" by Jerry Silverman, Jonathan M. Moody, and Freeman D. Shepherd, Scientific American, Mar. 1992, pp. 78–83.

"Noncontact Sheet Resistance Measurement Technique for Wafer Inspection" by Krzysztof Kempa, J. Martin Rommel, Roman Litovsky, Peter Becla, Bohumil Lojek, Frank Bryson, and Julian Blake, American Institute of Physics, Rev. Sci. Instrum., vol. 66, No. 12, Dec. 1995, pp. 5577–5581.

*Primary Examiner*—Stephone B. Allen
*Attorney, Agent, or Firm*—Eugene Stephens & Associates

[57] ABSTRACT

The contents of sealed envelopes are accessed using radiation to differentially heat information patterns within the contents and conduction to transfer corresponding thermal patterns to the envelopes' outer surfaces. The radiation is preferably within the wavelengths of microwaves or radio waves for penetrating the envelopes. The information pattern differentially absorbs the radiation by converting the attendant radiant energy into heat by either induction heating or dielectric heating. An infrared camera or other thermally sensitive device converts the thermal patterns conducted to the envelopes' outer surfaces into corresponding electrical patterns for further processing.

50 Claims, 3 Drawing Sheets

U.S. PATENT DOCUMENTS

| | | |
|---|---|---|
| 5,234,798 | 8/1993 | Heninger et al. . |
| 5,260,576 | 11/1993 | Sommer, Jr. et al. . |
| 5,272,216 | 12/1993 | Clark, Jr. et al. . |
| 5,288,994 | 2/1994 | Berson . |
| 5,328,539 | 7/1994 | Sato . |
| 5,339,962 | 8/1994 | Sommer, Jr. et al. . |
| 5,344,398 | 9/1994 | Hara . |
| 5,349,905 | 9/1994 | Taylor et al. . |
| 5,371,531 | 12/1994 | Rezanka et al. . |
| 5,385,803 | 1/1995 | Duff et al. . |
| 5,410,283 | 4/1995 | Gooray et al. . |
| 5,417,494 | 5/1995 | Kempa et al. . |
| 5,422,463 | 6/1995 | Gooray et al. . |
| 5,429,246 | 7/1995 | Kaiser et al. . |
| 5,500,668 | 3/1996 | Malhotra et al. . |
| 5,518,124 | 5/1996 | Sommer, Jr. et al. . |
| 5,522,921 | 6/1996 | Custer . |

METHOD AND APPARATUS FOR ACCESSING CONTENTS OF ENVELOPES AND OTHER SIMILARLY CONCEALED INFORMATION

TECHNICAL FIELD

The invention relates to the acquisition of encoded information from the contents of sealed envelopes or other layered structures that conceal the information from view.

BACKGROUND

Much of bulk return mail is processed with at least some manual handling, especially when it contains orders. Once cut open, the envelopes are generally emptied by hand, and information from their contents is keyboarded, optically scanned, or otherwise entered into a computer. The required steps of opening the envelopes, separating their contents, and entering relevant data are expensive and time consuming. Also, data entry is subject to error, especially when information from the separated envelopes must be linked to information from their contents.

Outgoing mail, which may be passed through inserters, is also subject to sorting and other processing errors that are difficult to detect; because once sealed, the contents are concealed from view. Various attempts have been made to "see through" the envelopes to read their contents without opening them, but problems plague each.

U.S. Pat. No. 5,522,921 to Custer proposes use of x-rays for reading envelope contents that are printed with special x-ray opaque materials. The x-rays are intended to penetrate the envelopes and their contents except where blocked by the special materials. A resulting shadow pattern is detected by an x-ray reading device. However, the special materials add expense and limit printing options, and the x-rays pose health risks that are difficult to justify for these purposes.

U.S. Pat. No. 5,288,994 to Berson uses infrared light in a similar manner to read the contents of sealed envelopes. A light source directs a beam of the infrared light through the envelopes to an optical detector that records a shadow pattern caused by different absorption characteristics between conventional inks and the paper on which they are printed. However, such filled envelopes make poor optical elements for transmitting images, even for transmissions in the infrared spectrum. Paper does not transmit the infrared images very efficiently. Irregularities in the surfaces, spacing, layering, and materials of the envelopes and their contents cause significant aberrations that can greatly diminish resolution of the images. Also, overlays of printed material on the envelopes and their contents are difficult to separate, and printed backgrounds can reduce contrast.

Except for differences in wavelength, these prior art attempts are analogous to shining a flashlight through one side of an envelope in the hope of reading darker printed matter through the envelope's opposite side. X-rays penetrate paper very easily but are dangerous and require special materials to stop them. Near infrared wavelengths transmit poorly through paper, and their images are subject to aberration from optical inconsistencies and to obscuration from printed overlays or backgrounds.

SUMMARY OF INVENTION

Our invention takes a different approach to accessing information from the contents of sealed envelopes or other layered structures by separating the optical functions of illuminating and imaging the concealed information. For example, none of the radiation involved with illuminating the information is also involved with its imaging. Instead, a non-optical mechanism transfers a reproduction of the illuminated information to an exterior surface, where it can be directly imaged or otherwise freely accessed.

According to our preferred embodiment, a selected wavelength of light longer than infrared radiation is used to penetrate the envelopes. Microwaves or radio waves can be used—either of which transmit through paper or similar materials much better than infrared radiation. An information pattern recorded in the contents of the envelopes is arranged to have a different absorption coefficient to the selected wavelength than the remaining contents. Radiant energy differentially absorbed by the information pattern is first converted into a corresponding thermal pattern and is then conducted to respective outer surfaces of the envelopes by transfers of kinetic energy. Once exposed on the envelopes' outer surfaces, the thermal pattern is imaged onto an infrared camera or otherwise detected by temperature-sensitive instruments.

The radiant energy can be absorbed within the information pattern by induction heating or dielectric heating depending on the materials used to encode the information. For example, the oscillating electromagnetic fields of the selected wavelength radiation can induce eddy currents in specially matched conductive materials or mechanical vibrations in specially matched dielectric materials for differentially heating the information pattern. The absorption characteristics of such materials that can be used as inks or ink additives are well known or can be readily determined. For example, carbon-based inks work well for induction heating, and materials (such as micro-encapsulated water) having polar molecules with high dielectric constants work well for dielectric heating.

Thus, the radiation that penetrates the envelopes is used to differentially heat the information patterns rather than to project images of the patterns through the envelopes. No images of the information patterns are formed until thermal representations of the information patterns are conducted to the outer surfaces of the envelopes. Then, the thermal representations can be imaged by focusing infrared radiation from the representations on an infrared detector array or can be otherwise captured by detecting temperature differences throughout the pattern.

Our new approach to acquiring information concealed within envelopes is preferably practiced with an in-line system including separate stages for irradiating the envelopes and detecting the thermal pattern transferred to the outer surfaces of the envelopes. A transporter moves a succession of the envelopes having information patterns imprinted in their contents through the separate stations. A radiation emitter irradiates the envelopes with radiation having a wavelength longer than infrared light for penetrating the envelopes and for differentially heating the information patterns imprinted in their contents. A compactor compresses the envelopes and their contents for enhancing conduction of corresponding thermal patterns of the differentially heated information patterns to outer surfaces of the envelopes. A detector converts the thermal patterns on the outer surfaces of the envelopes into corresponding electrically processable patterns for accessing the information recorded in the contents of the envelopes.

Well-known pattern recognition programs can be used to read the recorded information for controlling subsequent operations. For example, orders and customer-identifying codes from return mail can be read for processing orders.

Inside addresses or other contents of outgoing mail can be verified or used as a basis for printing information including address information on the outside of the envelopes.

DRAWINGS

DETAILED DESCRIPTION

Figure 1:
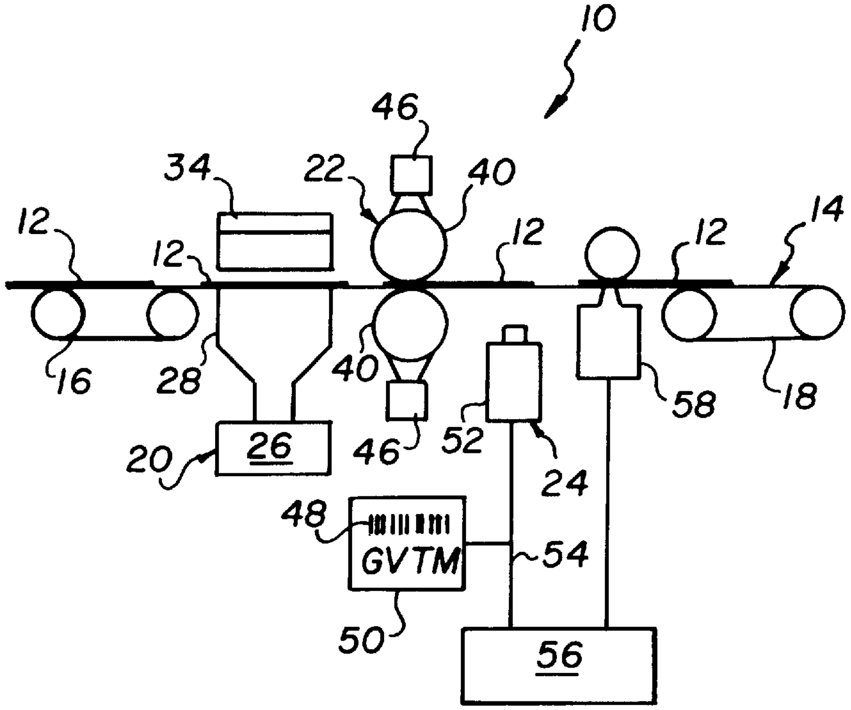
FIG. 1 is a diagram of an in-line system having a series of stations for accessing information within sealed envelopes.

An exemplary in-line system 10 for acquiring information concealed within a succession of sealed envelopes 12 is depicted in FIG. 1. The envelopes 12 are preferably opaque to visible light. A transporter 14 formed in part by series of endless belts 16 and 18 moves the envelopes 12 through a series of stations, which include a radiation emitter 20, a compactor 22, and a detector 24.

Figure 2:
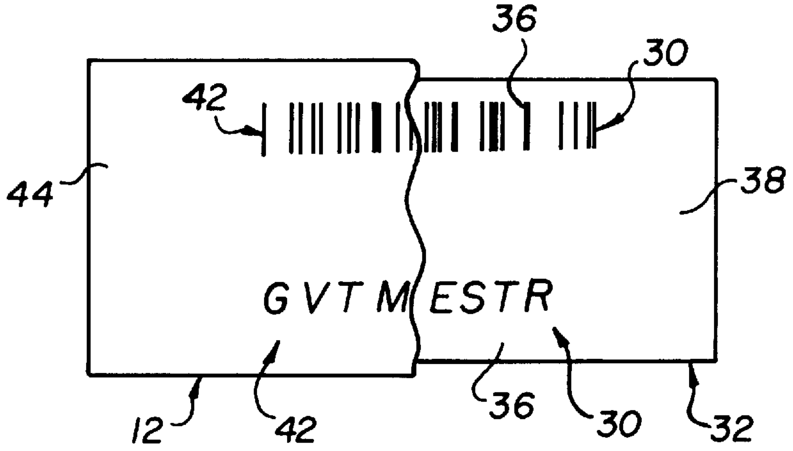
FIG. 2 is a cut-away view of one of the envelopes revealing an information pattern among its contents. A thermal representation of the information pattern is depicted on the envelope's surface.

A magnetron 26 of the radiation emitter 20 emits a predetermined wavelength of microwave radiation into a slotted waveguide 28 that broadcasts the microwaves over an area through which the envelopes 12 are transported. As seen in FIG. 2, the microwaves penetrate the envelopes 12 and differentially heat information patterns 30 that are printed on their contents 32, such as letters or other inserts. A load 34, which can be cooled by conventional means, captures excess microwave radiation passing through the envelopes 12.

The information patterns 30, which are shown in FIG. 2, are formed by printing substances 36 on substrates 38. Preferably, the printing substances 36 have absorption peaks in the vicinity of the predetermined wavelength of microwave radiation, and the substrates 38 (as well as the envelopes 12) do not similarly absorb the predetermined wavelength. The absorbed radiation can be converted into heat by either induction heating or dielectric heating depending on the relative characteristics of the printed substances 36 and the substrates 38.

For example, conductive inks, such as carbon black, indium tin oxide, silver graphite, and flexo-carbon ink that is N-propyl acetate based, can be used to convert the selected wavelengths of energy into heat by induction heating. Substances containing polar molecules with a high dielectric constant, such as micro-encapsulated water or titanium dioxide, can be used to convert the selected wavelengths into heat by dielectric heating.

In either case, the substrates 38 are preferably paper, which is a dielectric. However, other non-conducting materials including resin films or fabric materials can also be used as substrates for supporting conductive substances subject to induction heating; and other materials including dielectric materials having different absorption characteristics can be used as substrates for supporting dielectric substances subject to dielectric heating. The preferred frequency band for microwave heating is between 300 and 3000 megahertz.

Immediately after heating, the compactor 22, which is depicted as a pair of rollers 40, compresses the envelopes 12 and their respective contents 32 together to assist conduction of thermal representations 42 of the differentially heated information patterns 30 to outer surfaces 44 of the envelopes 12. The thermal representations 42 are conducted through the envelopes 12 and any intervening layers to the outer surfaces 44 by transfers of kinetic energy. Compressing the envelopes 12 limits the distance and the amount of air through which the representations 42 must be conducted before reaching the outer surfaces 44.

The transfers of heat that conduct the thermal representations 42 to the outer surfaces 44 of the envelopes 12 take place before much blurring of the original information pattern takes place, even through several intervening layers of paper. Coolers 46 (e.g., fans or other fluid-circulating devices) remove any excess heat transferred to the rollers 40 to prevent unwanted transfers of heat from the rollers 40 to succeeding envelopes 12.

A vacuum pump (not shown) could be used in place of the rollers 40 to evacuate air from between the envelopes 12 and their contents 32. Compacting can also be accomplished by passing the envelopes 12 through an electrostatic field that generates an attractive force between oppositely charged surfaces of the envelopes.

Following the arrival of the thermal representations 42 on the outer surfaces 44 of the envelopes 12 but before any significant blurring takes place, the detector 24, which is preferably an infrared camera 52, converts the thermal representations 42 on the outer surfaces 44 into electronically processable representations 48 shown on a video display 50. For example, infrared radiation emitted from the thermal representations 42 is focused onto a detector array of the infrared camera 52. Signals 54 convey the electronically processable representations 48 of the imaged thermal representations 42 to a computer 56 for further processing.

Capturing such images of the thermal representations 42 from rapidly moving envelopes 12 may require use of some specialized electronic equipment such as sliding buffers to assemble the images from the changing output of linear detector arrays. Such equipment for assembling images of the outer surfaces of moving envelopes is already well known and can be readily adapted for use with infrared detectors. Within the computer 56, conventional recognition programs can be run to interpret the information pattern 30.

A variety of further processing can take place based on the information acquired from the contents 32 of the envelopes. For example, the envelopes 12 can be sorted according to their contents, orders or replies can be generated, records can be updated, or the information can be verified. In the in-line system 10 of FIG. 1, a conventional printer 58 is controlled to print information on the envelopes' outer surfaces 44, which is linked to the information acquired from the contents 32 of the envelopes 12. For example, addresses can be printed to match address or other identifying information acquired from the contents 32 of the envelopes 12.

Figure 3:
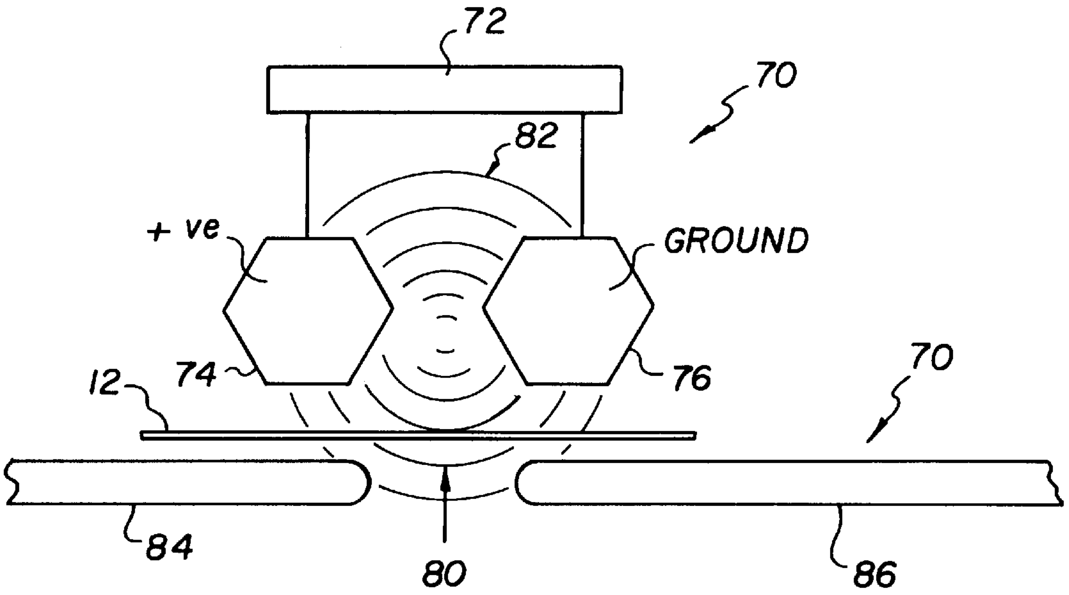
FIG. 3 is a diagram of an alternative radiation emitter for exposing the envelopes to radio waves instead of microwaves.
Figure 4:
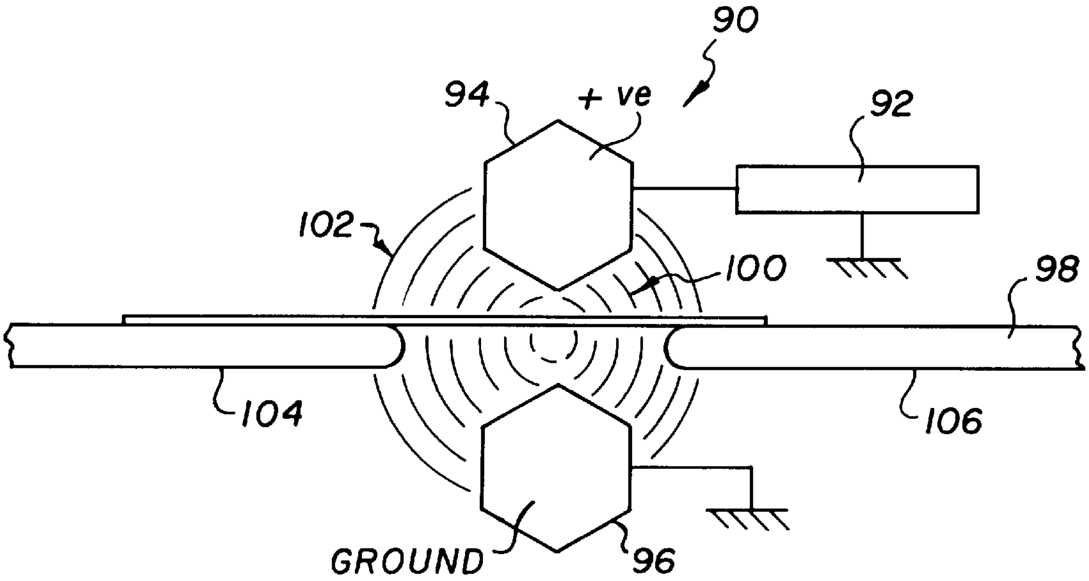
FIG. 4 is a diagram of a similar radiation emitter with two electrodes that are positioned differently.

FIGS. 3 and 4 show two alternative radiation emitters 70 and 90, which can be substituted for the radiation emitter 20 of FIG. 1 to irradiate the envelopes 12 with radio waves instead of microwaves. Again, the information patterns 30 shown in FIG. 2 can be differentially heated by either induction heating or dielectric heating, but the absorption peak is within the spectrum of radio waves. The preferred frequency band of the radio waves is between 2 megahertz and 300 megahertz.

In FIG. 3, the radiation emitter 70 includes a radio frequency generator 72 and two electrodes 74 and 76. The envelopes 12 are advanced by an alternative transporter 78 through a fringe portion 80 of an electric field 82 between the two electrodes 72 and 74. Endless belts 84 and 86 of the transporter 78 are spaced apart in the vicinity of the electrodes 74 and 76 to preserve the structure of the electric field 82.

In FIG. 4, the radiation emitter 90 includes a similar radio frequency generator 92 and two electrodes 94 and 96. An alternative transporter 98 advances the envelopes 12 between the two electrodes 94 and 96 for exposing the envelopes to a central portion 100 of an electric field 102. Again, endless belts 104 and 106 are spaced apart to avoid disturbing the electric field 102.

Figure 5:
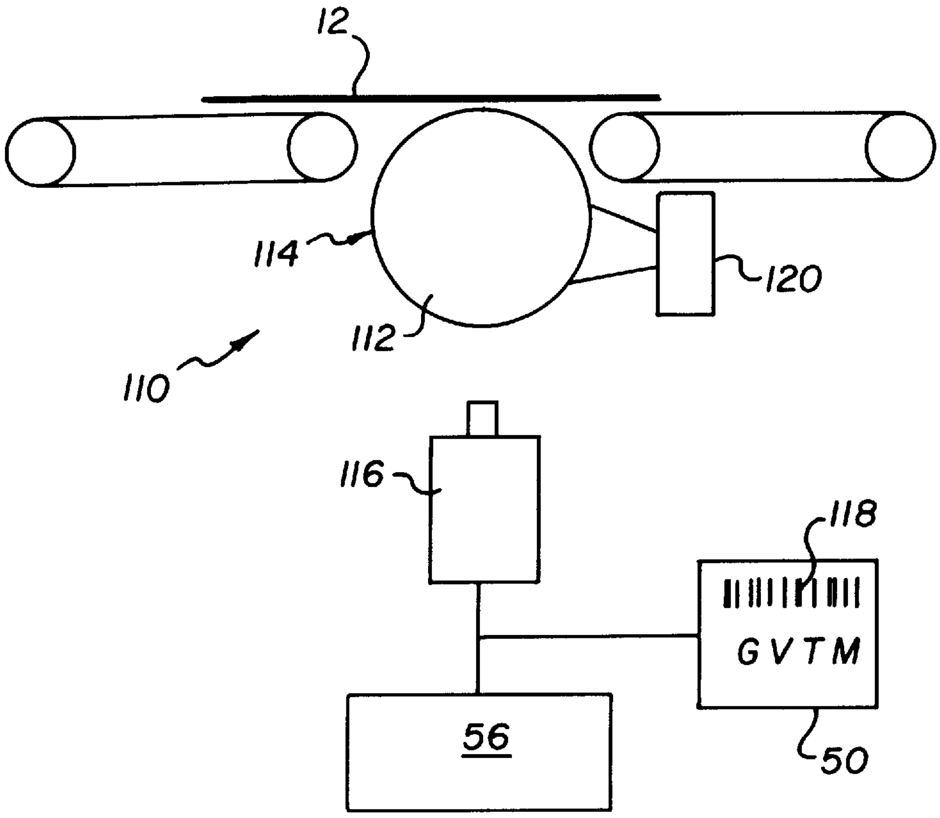
FIG. 5 is a diagram of an alternative detector for converting the thermal representation of the information pattern into an electronically processable representation.

An alternative detector 110 is shown in FIG. 5. The detector 110 includes a drum 112 coated with a thermosensitive material that reacts to temperature variations by changing in color. Accordingly, the thermal representation 42 on the outer surfaces 44 of the envelopes 12 is converted into a color pattern 114. A camera 116 sensitive to light within the visible spectrum converts an image of the color pattern 114 into an electronically representation 118 that can be further processed by the computer 56. A cooler 120 resets the drum to a constant temperature for recording another thermal representation 42.

Other detectors could also be used for recording thermal representations 42 including detectors for directly sensing temperature variations on the envelopes' outer surfaces. Coolers could also be used in advance of the radiation emitter 20 to optimize initial starting temperatures of the envelopes 12 and enhance contrast.

Two or more information patterns can be recorded using different materials that respond uniquely to different wavelengths of radiation or that have different absorption coefficients to radiation at a given wavelength. Each information pattern would be separately heated by different irradiators but similar detectors could be used. Unique materials could be used as markers, where the mere presence of such markers would have significance. Also, either the direct image of the information pattern (e.g., the actual print) or its inverse (e.g. the background) could be heated, although the former is preferred.

We claim:

1. A method of accessing information encoded on a substrate behind a cover comprising the steps of:

encoding the information in a pattern on the substrate using a substance having in comparison to the substrate a different absorption coefficient to radiant energy at a wavelength longer than infrared light;

irradiating the substrate through the cover with the radiant energy having a wavelength longer than infrared light;

transferring a thermal reproduction of the information pattern to a surface of the cover; and detecting the thermal reproduction on the cover's surface for accessing the information encoded on the substrate.

2. The method of claim 1 in which the substance used to encode the information pattern on the substrate converts the radiant energy to heat energy by induction heating.

3. The method of claim 2 in which the substance used to encode the information pattern on the substrate is a more electrically conductive material than the substrate.

4. The method of claim 3 in which the substance used to encode the information pattern on the substrate is a conductive material and the substrate is a dielectric material.

5. The method of claim 3 in which the substance used to encode the information pattern on the substrate is an electrically conductive ink.

6. The method of claim 1 in which the substance used to encode the information pattern on the substrate converts the radiant energy into heat energy by dielectric heating.

7. The method of claim 6 in which both the substance used to encode the information pattern on the substrate and the substrate are dielectric materials having different dielectric constants.

8. The method of claim 6 in which the substance used to encode the information pattern on the substrate contains polar molecules that oscillate in response to the absorption of radiant energy.

9. The method of claim 1 in which said step of transferring the thermal reproduction includes conducting the thermal reproduction through the cover by transfers of kinetic energy.

10. The method of claim 9 in which said step of transferring the thermal reproduction includes a step of compressing the substrate and the cover together.

11. The method of claim 10 in which said step of compressing includes a step of evacuating air from between the substrate and the cover.

12. The method of claim 1 in which said step of detecting includes using an infrared camera to view infrared emission from the thermal reproduction on the cover's surface.

13. The method of claim 12 in which the infrared camera converts the thermal reproduction to an electrically processable reproduction.

14. The method of claim 1 in which said step of detecting includes a step of converting the thermal reproduction into a visible image.

15. The method of claim 14 in which said step of converting includes transferring the thermal reproduction to a thermosensitive imaging material that reacts to temperature variations by changes in color.

16. The method of claim 15 in which the color changes of the thermosensitive imaging material are reversible for transferring a succession of different thermal reproductions.

17. The method of claim 16 in which said step of detecting also includes using a camera sensitive to light within the visible spectrum to view the color changes of the thermosensitive imaging material.

18. The method of claim 1 including a further step of electronically processing the detected thermal reproduction for carrying out different subsequent steps depending on the information encoded on the substrate.

19. The method of claim 18 in which said step of processing also includes using an optical character recognition program for reading the information encoded on the substrate.

20. A method of accessing information recorded in the contents of envelopes without opening the envelopes comprising the steps of:

transporting a succession of unopened envelopes having an information pattern recorded in their contents;

irradiating the envelopes with radiation having a wavelength longer than infrared light for penetrating the envelopes;

differentially absorbing radiant energy from the radiation having a wavelength longer than infrared light within the information pattern;

converting the radiant energy absorbed within the information pattern into a corresponding thermal pattern;

conducting the thermal pattern to outer surfaces of the envelopes; and detecting the conducted thermal pattern on the outer surfaces of the envelopes for accessing the information recorded in the contents of the envelopes.

21. The method of claim 20 in which the wavelength of the radiation is within a range of microwaves.

22. The method of claim 20 in which the wavelength of the radiation is within the range of radio waves.

23. The method of claim 20 in which the information pattern exhibits a higher absorption coefficient of the radiant energy than immediately adjacent portions of the contents.

24. The method of claim 23 in which the information pattern has an absorption peak that corresponds to the wavelength of the radiation.

25. The method of claim 20 in which the envelopes are substantially opaque to visible and infrared radiation but conduct heat by transfers of kinetic energy.

26. The method of claim 25 in which said step of detecting includes detecting infrared emissions from the thermal pattern on the outer surfaces of the envelopes.

27. The method of claim 20 in which said step of transporting includes moving the unopened envelopes along an in-line system for performing the steps of irradiating, conducting, and detecting.

28. The method of claim 27 in which said step of transporting includes performing said steps of irradiating and detecting at separate stations along the in-line system.

29. The method of claim 28 in which said step of conducting takes place between the stations for carrying out the steps of irradiating and detecting.

30. The method of claim 20 in which said step of conducting includes a step of compressing the envelopes and their contents.

31. The method of claim 30 in which said step of compressing includes evacuating air from between the envelopes and their contents.

32. The method of claim 20 including a further step of electronically processing the detected thermal pattern for reading the information recorded in the envelopes' contents.

33. The method of claim 32 in which said step of electronically processing includes using a character recognition program.

34. The method of claim 32 in which said step of electronically processing includes controlling a subsequent operation performed on the envelopes based on the information read from their contents.

35. The method of claim 20 in which said step of detecting includes using an infrared camera to view infrared emissions from the thermal pattern on the envelopes' outer surfaces.

36. The method of claim 35 in which the infrared camera converts the thermal pattern to an electrically processable image.

37. The method of claim 20 in which said step of detecting includes a step of converting the thermal pattern into a visible image.

38. The method of claim 37 in which said step of converting includes transferring the thermal pattern to a thermosensitive imaging material that reacts to temperature variations by changes in color.

39. The method of claim 38 including a further step of detecting the visible image using a camera sensitive to light within the visible spectrum to view the color changes of the thermosensitive imaging material.

40. A system for accessing information recorded in the contents of envelopes without opening the envelopes comprising:

a transporter that moves a succession of the envelopes having information patterns imprinted in their contents;

a radiation emitter that irradiates the envelopes with radiation having a wavelength longer than infrared light for penetrating the envelopes and for differentially heating the information patterns imprinted in their contents;

a compactor that compresses the envelopes and their contents for enhancing conduction of corresponding thermal patterns of the differentially heated information patterns to outer surfaces of the envelopes; and a detector for converting the thermal patterns on the outer surfaces of the envelopes into corresponding electrically processable patterns for accessing the information recorded in the contents of the envelopes.

41. The system of claim 40 in which said detector detects radiation emitted from the thermal patterns within a range of wavelengths shorter than the wavelength used for differentially heating the information patterns.

42. The system of claim 41 in which said detector is an infrared camera.

43. The system of claim 40 in which said radiation emitter and said detector are located in different positions along the transporter so that emissions from said radiation emitter do not impinge upon said detector.

44. The system of claim 40 in which said radiation emitter emits microwave radiation.

45. The system of claim 44 in which said radiation emitter includes a magnetron for generating the microwave radiation and a waveguide for conducting the radiation to the envelopes.

46. The system of claim 40 in which said radiation emitter emits radio wave radiation.

47. The system of claim 46 in which said radiation emitter includes a radio frequency generator and two electrodes for shaping an electric field through which the envelopes are transported.

48. The system of claim 40 in which the wavelength of radiation emitted by said radiation emitter differentially heats the information pattern by induction heating.

49. The system of claim 40 in which the wavelength of radiation emitted by said radiation emitter differentially heats the information pattern by dielectric heating.

50. The system of claim 40 in which said detector senses temperature variations within the thermal patterns on the outer surfaces of the envelopes.

* * * * *